United States Patent [19]

Yau

[11] Patent Number: 5,495,596

[45] Date of Patent: Feb. 27, 1996

[54] METHOD FOR CLOCKING FUNCTIONAL UNITS IN ONE CYCLE BY USING A SINGLE CLOCK FOR ROUTING CLOCK INPUTS TO INITIATE RECEIVE OPERATIONS PRIOR TO TRANSMIT OPERATIONS

[75] Inventor: Daniel Yau, Los Altos, Calif.

[73] Assignee: Silicon Graphics, Inc., Mountain View, Calif.

[21] Appl. No.: 923,086

[22] Filed: Jul. 31, 1992

[51] Int. Cl.[6] .................................................. G06F 1/12
[52] U.S. Cl. ................... 395/550; 364/271.5; 364/271.2; 364/271.4; 364/DIG. 1
[58] Field of Search ................................................ 395/550

[56] References Cited

U.S. PATENT DOCUMENTS

| 4,827,401 | 5/1989 | Hrustich et al. | 395/550 |
|---|---|---|---|
| 5,247,656 | 9/1993 | Kabuo et al. | 395/550 |
| 5,276,807 | 1/1994 | Kodama et al. | 395/200 |
| 5,303,261 | 4/1994 | Junod et al. | 375/4 |

Primary Examiner—Thomas C. Lee
Assistant Examiner—Saing Hu Kim
Attorney, Agent, or Firm—Blakely, Sokoloff, Taylor & Zafman

[57] ABSTRACT

A method and circuit providing for an accurate sampling of data on a high speed bus in a computer system. Utilizing a single clock source, functional units that are capable of supporting two clock input sources, and a routing technique that provides for a receiving unit to be clocked prior to a transmitting unit, data transfer can occur reliably and economically on a high speed bus. Synchronization within a particular unit is accomplished by providing serial edge-triggered registers that are triggered by the respective clock inputs.

9 Claims, 11 Drawing Sheets

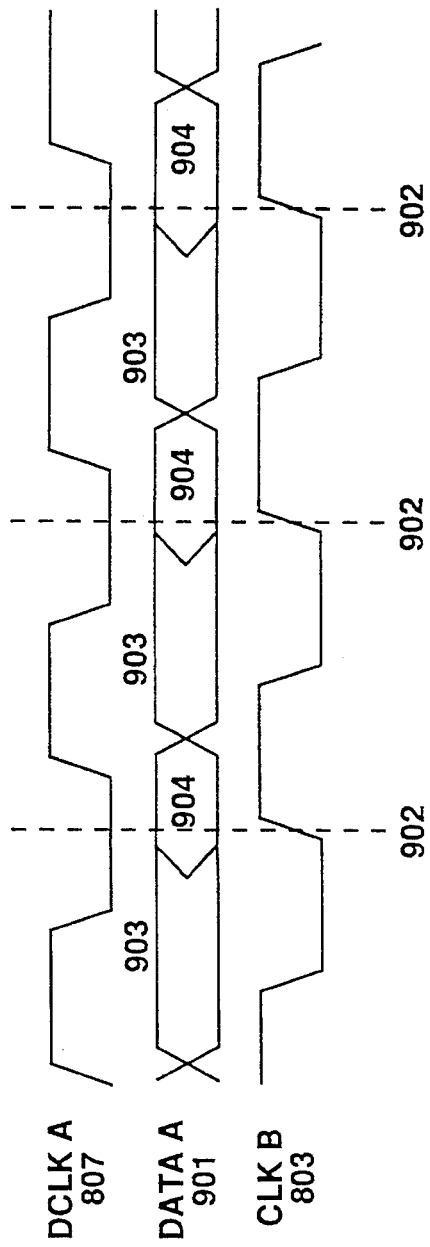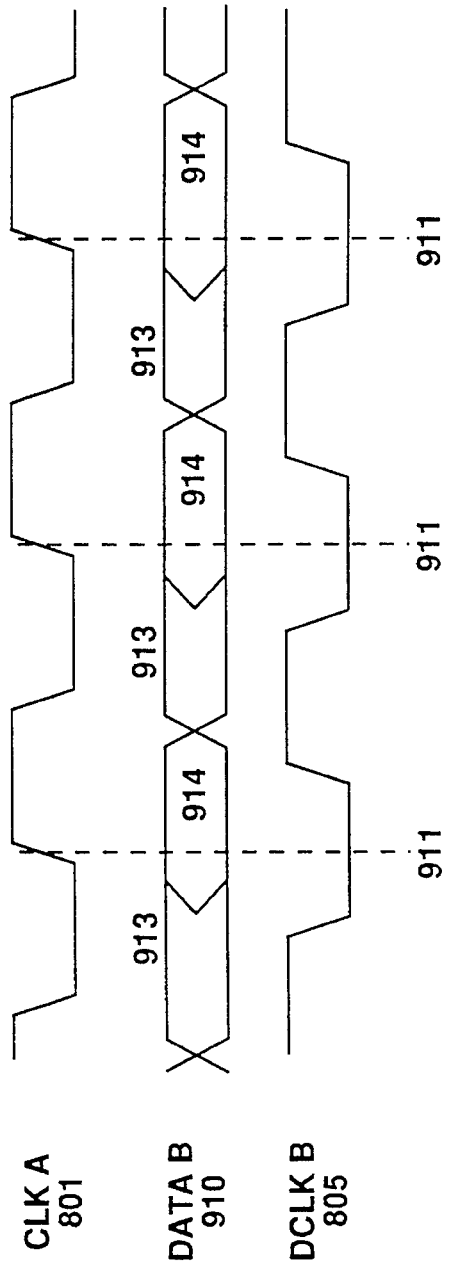

METHOD FOR CLOCKING FUNCTIONAL UNITS IN ONE CYCLE BY USING A SINGLE CLOCK FOR ROUTING CLOCK INPUTS TO INITIATE RECEIVE OPERATIONS PRIOR TO TRANSMIT OPERATIONS

BACKGROUND OF THE INVENTION

1. Field of the Invention

The present invention relates to the field of synchronization and timing of operation in a computer system, in particular to clocking schemes for use on a high speed local bus.

2. Description of the Related Art

As computer systems such as microcomputer systems and the class of computer systems commonly known as workstations, are developed to run at ever faster speeds, it is desirable to be able to sample (or read) data on a bus on every clock cycle. For example, it is desirable that a data sending device send data over a bus, during one clock cycle, to a data receiving device which receives that data during the same clock cycle; this means that a data transaction between the sending and the receiving devices will occur every clock cycle, resulting in maximum throughput of data over a given time. A clock cycle for a computer system is commonly measured in MegaHertz (MHz). The measurement refers to the number of times an oscillator completes a phase change cycle in one second, a MegaHertz representing one million such changes per second. A clock cycle is used for timing and synchronization purposes within a computer system, and the same clock signal is often used as the synchronization reference for both the data sending device and the data receiving device. In order to sample data on a bus, the data must be presented onto the bus by a transmitting unit and the data must be stabilized on the bus, i.e. be in a state that reflects the actual data presented by the transmitting unit. Only after the data is stable may the data be accurately sampled by a receiving unit.

Typically, a receiving unit will sample data on the rising edge of a clock cycle. Likewise, a transmitting unit will begin transmission of data on a rising edge. In known systems, transmitting units within a computer system would "hold" the data on the bus for a period of time after the transmitting unit has received the rising edge of a clock cycle, so that a receiving unit may accurately sample data on the bus. This "hold" time is especially critical when designing a high speed system. As chip components begin to operate faster, this hold time becomes shorter and shorter.

Referring to FIG. 1, assuming that a transmitting and receiving unit are synchronized from the same clock source, that the receiving unit is sampling the data on the bus on the rising edge of the clock cycle and that data is transmitted every clock cycle, CLK signal 101 and DATA signal 102 are illustrated. The areas 103 reflect where the data on a bus is unstable and the areas 104 reflect where the data on bus are stable. When data is transmitted onto the bus, a certain amount of start-up time is incurred which is reflected in the areas 103.

Assuming a start-up time where the data is unreliable, the data must be sampled within a portion of the clock cycle time where the data is reliable (i.e. stable). As the data is being sampled on the bus at a rising edge of a clock cycle (e.g. edge 105), the data must be stable for the period of time before new data is placed on the bus (i.e. there is a new clock cycle), for example at point 106. A hold time 107, is the time lapse between the rising edge sample time 105 and the transmission of data time 106. Thus, timing becomes critical so that data can be accurately sampled.

Currently, it is not commercially viable for vendors of chip components to guarantee an acceptable minimum data hold time under all operating conditions (i.e. under varying operating temperatures and under varying load conditions). As a result, most suppliers of data driving components often specify a zero (0) nanosecond minimum hold time for their components. However, receiving components have been designed to tolerate a zero nanosecond hold time, i.e. the data need not be held stable on the bus after the receiving unit has been clocked. Thus, it is critical that a receiving unit's clock source be at a rising edge prior to a clock source of a transmitting unit being at a rising edge to signal change of data. This has led to timing and synchronization problems, particularly when operating speeds approach 33 MHz.

As an additional consideration, within any given circuit, a certain amount of propagation delay will be incurred between components that are receiving a signal in a sequential or serial fashion. With a signal which provides a clock cycle, this propagation delay results in a small amount of skew that occurs between the clock inputs of the different components. As discussed above, this skew may cause problems when attempting to transmit data every clock cycle, especially with a zero nanosecond hold time. This is illustrated in FIG. 2. In FIG. 2, a data receiving unit's clock 205 lags a data transmitting units clock 206. This occurs because a clock source is routed physically to the transmitting unit before it gets to the receiving unit. Data 207 on the bus is comprised of valid or reliable areas 204 and invalid or unreliable areas 203. As data will be sampled on a rising edge of a data receiving unit's clock 205, e.g. sample points 201 and 202, with a zero nanosecond hold time, the data sample will be unreliable.

Several known approaches have been utilized to address this problem. A first approach is for the designer to hold the data transmitted onto the bus for multiple clock cycles (e.g. two), thus creating "hold time" based upon a complete clock cycle. This has the undesired effect of slowing computer system operation. A second approach is to route the clock signal so that a receiving unit has a clock input that precedes a transmitting unit's clock input and to utilize receiving components that tolerate zero (0) nanosecond input data hold times. In such a configuration, valid data would be sampled as illustrated in FIG. 3. In FIG. 3, a data receiving unit's clock 305, leads a data transmitting unit's clock 306. Data 307 on a bus is comprised of reliable areas 304 and unreliable areas 303. Here, sample points 301 and 302 will sample in areas 304 where the data is reliable. However, this approach is not viable where a unit may both send and receive data. When a unit may both send and receive data, the clock signal to the unit may be skewed in the proper direction for one transaction, e.g. transmit data, but would be skewed in the improper direction for the other transaction, e.g. receive data, bringing out the problem discussed with reference to FIG. 2.

A third approach known in the art, is to utilize components with dual clock inputs. In this approach, the components have a first clock input, e.g. LDCLK, which is used when the unit is receiving data and a second clock input, e.g. CLK for all other functions. Such a circuit utilizing this approach is illustrated in FIG. 4. In FIG. 4 when Unit A 401 wishes to transmit data to Unit B 402, certain handshaking signals are exchanged between the two units (not illustrated). Unit A 401 and Unit B 402 both have CLK input pins 405 and 406, and LDCLK input pins 407 and 408, respectively. Each of the units is further bidirectionally coupled to a data bus 411, via data lines 409 and 410, respectively. In operation, a LDCLK signal 404 will always lead a CLK signal 403. This is accomplished by utilizing means which will phase shift the two clock signal sources. Referring now to FIG. 5, the LDCLK signal 404 will lead the CLK signal 403 for a predetermined period of time. So, the LDCLK signal 404 will trigger a sample point 502 for the receiving unit to sample, which is within a period of time where the data is valid, e.g. area 504.

This solution has the deficiencies of requiring two different clocks and additional circuitry to insure that the two clocks are phase shifted in a fixed manner. A clock source that provides fixed phase shifted output may also be utilized, but that adds to the cost of the system.

It is an object of the invention to provide a method and apparatus for improved clocking in a computer system for use with a high speed data bus where a single clock source is used with components that send data and where a data transaction occurs during each clock cycle.

It is also known that the utilization of dual clock circuits may result in synchronization problems within each unit. Such a synchronization problem arises within the internal circuitry of a unit causing skews which may result in invalid or unreliable data being transmitted or received. It is a further object of the invention to provide a circuit design technique where such synchronization problems within a unit may be addressed.

SUMMARY OF THE INVENTION

In a computer system comprised of at least two units capable of both transmitting and receiving data, a method and apparatus for high speed clocking where a single clock source is utilized and each unit may both transmit and receive data. Each unit has two clock inputs. Each unit uses the traditional clock (CLK) for all functions (i.e., internal clock references, data sampling, etc.) except that of driving data onto the local bus. The units use a separate data clock input (DCLK) as the reference for the transmission of data. Each Unit has CLK and DCLK input pins so that known routing techniques can be applied to ensure that a circuit's CLK inputs lead all of it's DCLK inputs. That is, the circuit paths of the DCLK inputs are longer than the longest physical circuit path for a CLK input.

The method of the present invention would generally involve the steps of: providing a clock signal, routing the clock signal to the CLK input of a first unit, routing the clock signal to the CLK input of a second unit, routing the clock signal to the DCLK input of the first unit and routing the clock signal to the DCLK input of the second unit.

The present invention may be utilized in a computer system having a processor, random access memory, input/output devices and a bus for conveying information between the units within the computer system. Upon implementing the present invention on a computer system, the computer system would further include a clock signal source providing a clocking signal, a first unit having a first and second input for receiving a clock signal, a second unit having a third and fourth input for receiving the clock signal and clock signal coupling means. The clock signal coupling means would provide the clocking signal to the first and second input of said first unit and the third and fourth inputs of the second unit. The clock signal coupling means would provide the clocking signal to the first input of the first unit and the third input of the second unit before providing the clocking signal to the second input of the first unit and the fourth input of the second unit. Further, in the computer system the first input of the first unit and the third input of the second unit are read operation clocking inputs and the second input of the first unit and said fourth input of the second unit are write operation clocking inputs.

Further disclosed is a circuit design technique that addresses a problem of synchronizing the utilization of the two clock inputs within a particular unit. Since the logic of the unit will be clocked according to the CLK input, a synchronization problem may occur when data is being output using the DCLK input. This is addressed by placing a pair of edge triggered D flip-flops in series where the first D flip flop is clocked using the CLK signal and the second D flip-flop is clocked using the DCLK signal. This technique may be used as part of the design of new circuits or be added to existing circuits.

BRIEF DESCRIPTION OF THE DRAWINGS

FIGS. 9a and 9b are timing diagrams illustrating data sampling as embodied in the present invention.

DESCRIPTION OF THE PREFERRED EMBODIMENT

A method and apparatus for utilizing a single clock source in a computer system with a high speed bus is disclosed. In the following description, numerous specific details are set forth such as data bus coupling, in order to provide a thorough understanding of the present invention. It will be obvious, however, to one skilled in the art that the present invention may be practiced without these specific details. In other instances, well-known control signals, e.g. handshaking signals, have not been shown in detail in order not to unnecessarily obscure the present invention.

Overview of a Computer System in the Preferred Embodiment

Figure 1:
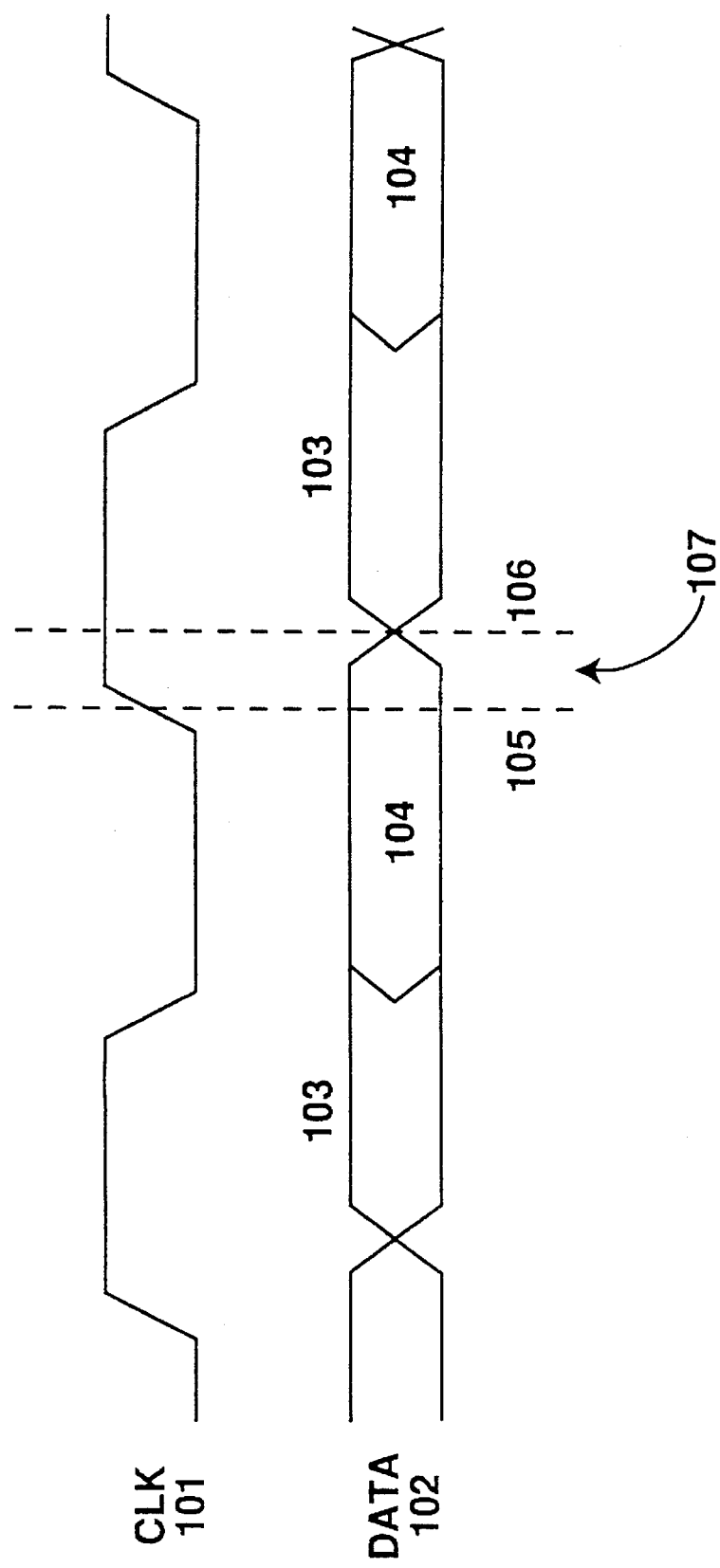
FIG. 1 is a timing diagram illustrating a hold time.
Figure 2:
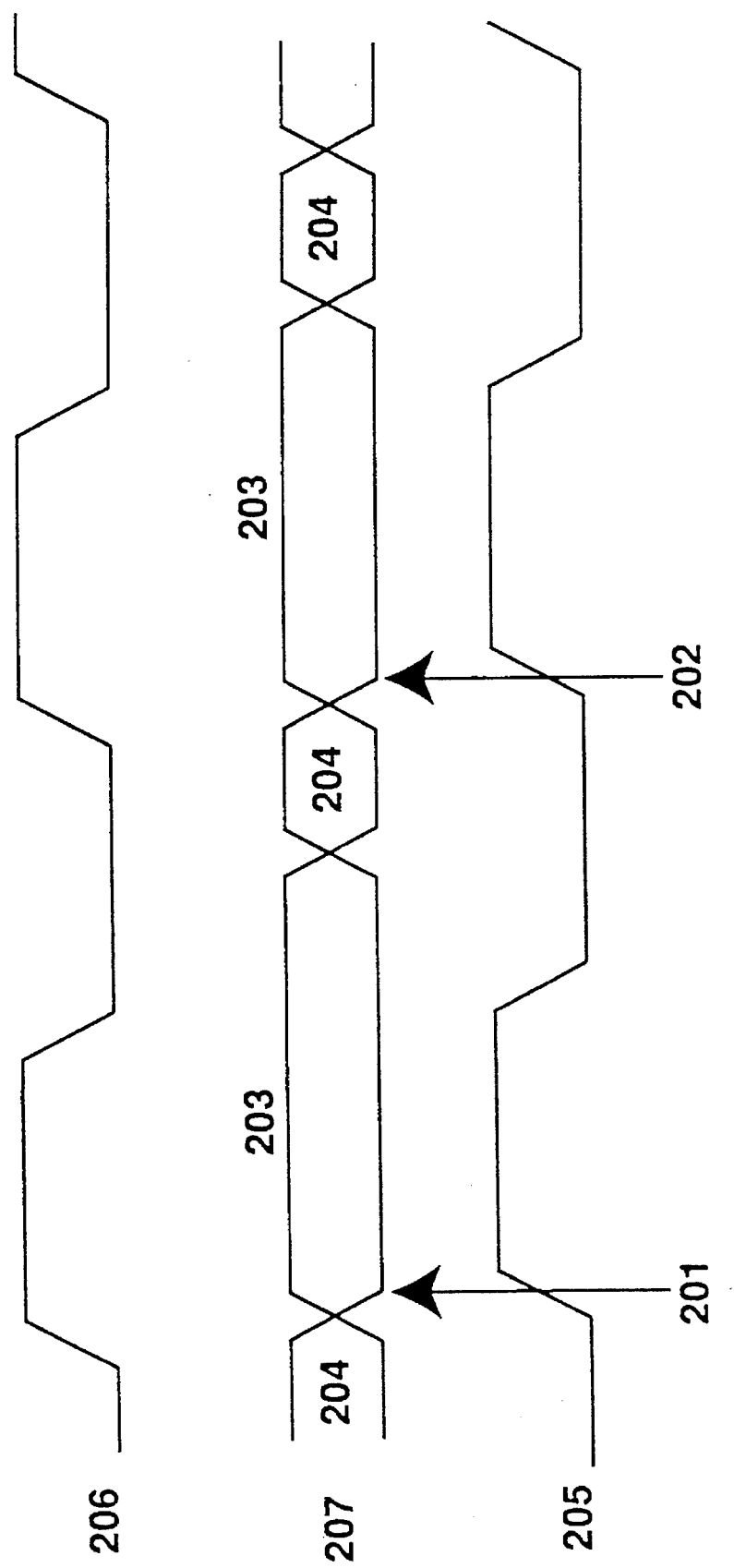
FIG. 2 is a timing diagram illustrating skew between a data receiving unit's clock input and a data transmitting unit's clock input.
Figure 3:
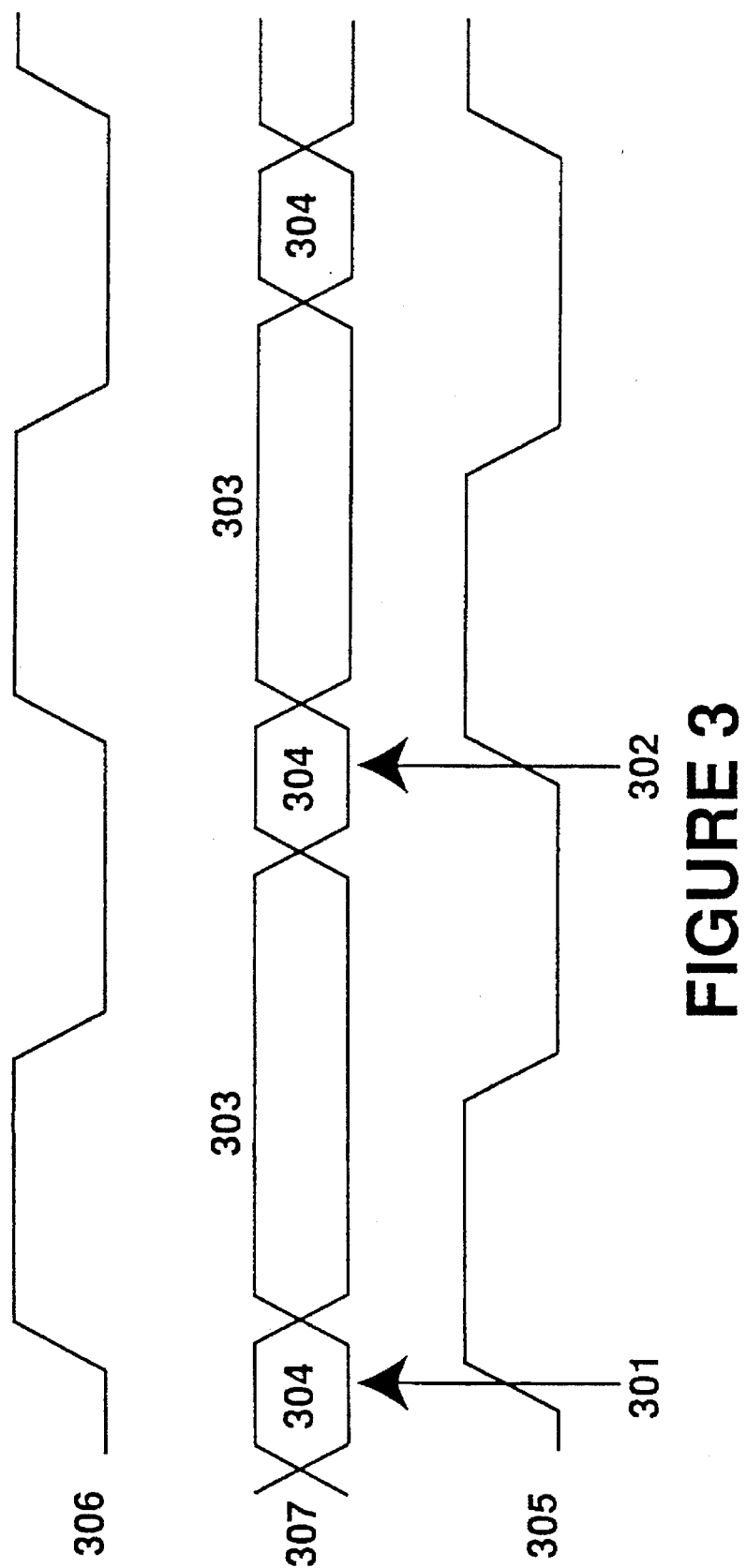
FIG. 3 is a timing diagram illustrating a data receiver clock input leading a data transmitter clock input.
Figure 4:
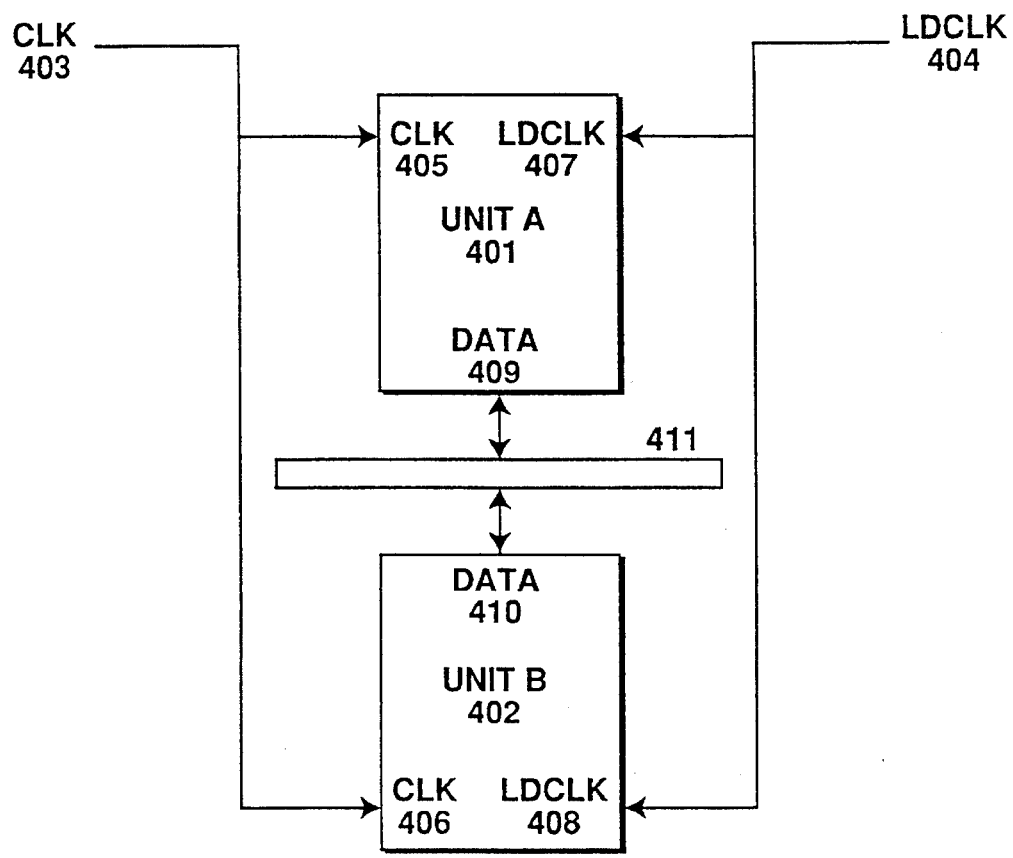
FIG. 4 is a block diagram of a prior art circuit to address skewing of clock inputs.
Figure 5:
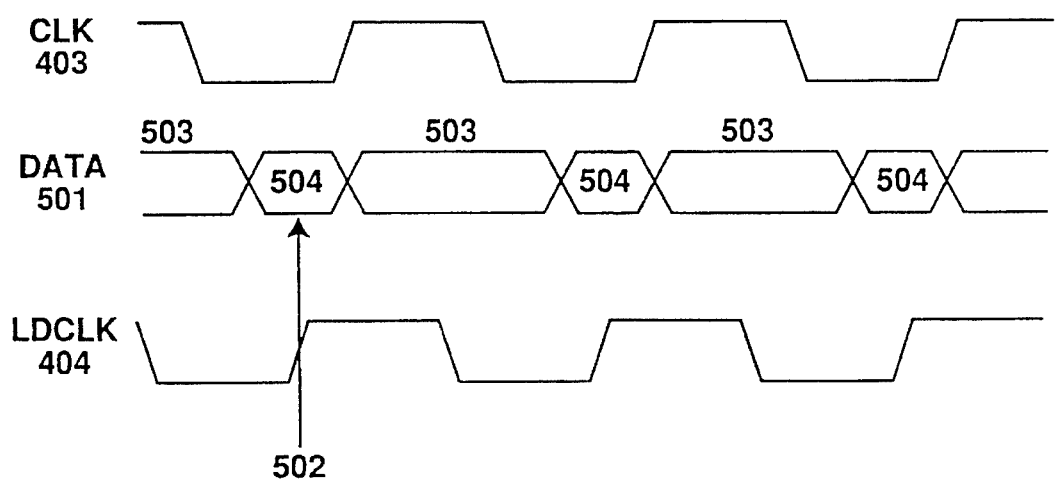
FIG. 5 is a timing diagram illustrating a prior art circuit of FIG. 4.
Figure 6:
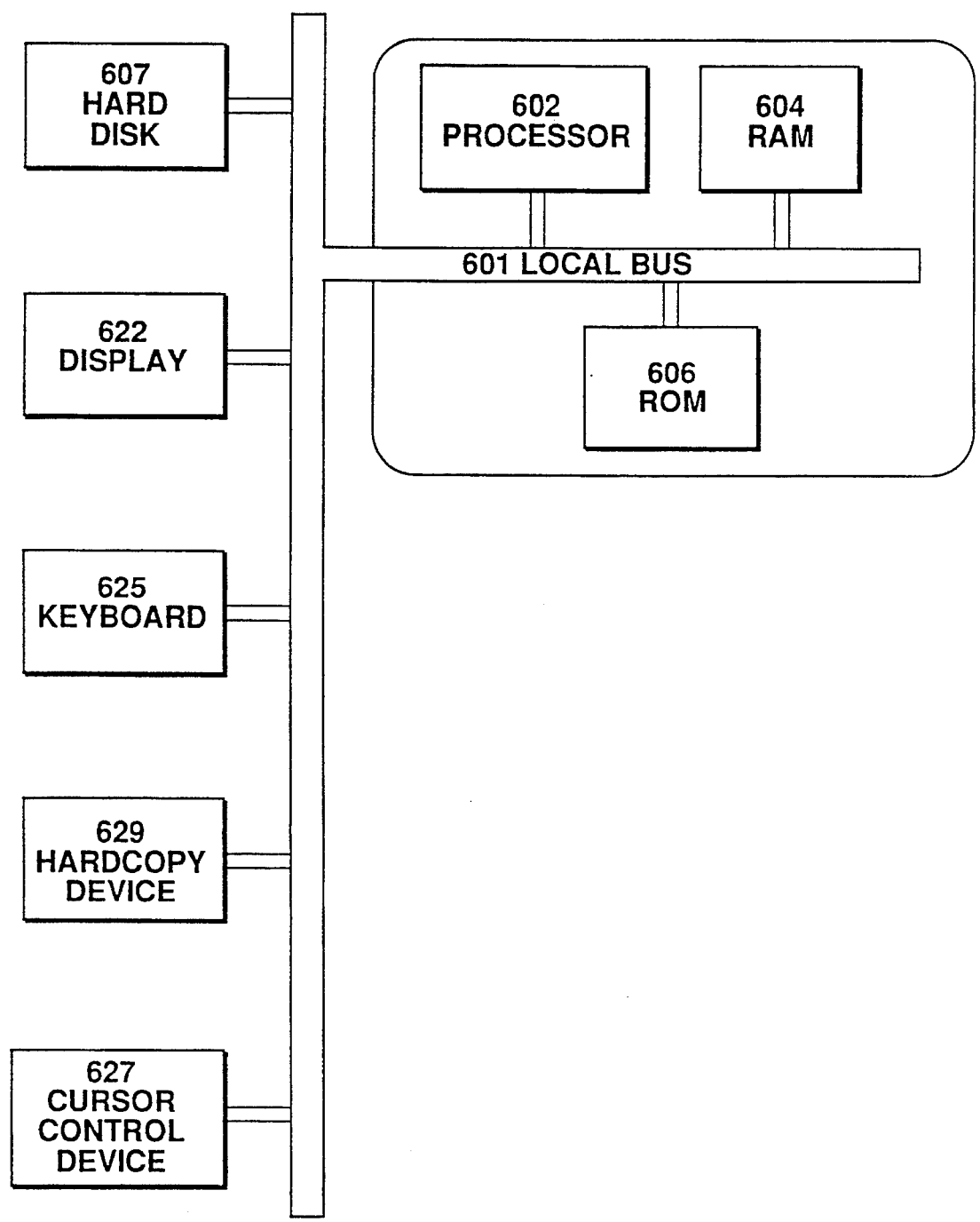
FIG. 6 is a block diagram of a computer system as may be utilized by the present invention.

The computer system of the preferred embodiment is described with reference to FIG. 6. The present invention may be implemented on any computer system that utilizes a bus architecture, but is especially useful for microcomputer systems that operate at high processing speeds. Such microcomputer systems are often called "workstations", available from numerous manufacturers, including Silicon Graphics Corporation of Mountain View, Calif. Of course, the present invention may also be implemented on a multi-user system while encountering all of the cost, speed and function advantages and disadvantages available with these machines.

In any event, a computer system as may be utilized by the preferred embodiment generally comprises a bus or other communication means 601 for communicating information, a processing means 602 coupled with said bus 601 for processing information, a random access memory (RAM) or other storage device 604 (commonly referred to as a main memory) coupled with said bus 601 for storing information and instructions for said processor 602, a read only memory (ROM) or other static storage device 606 coupled with said bus 601 for storing static information and instructions for said processor 602, a data storage device 607, such as a magnetic disk and disk drive, coupled with said bus 601 for storing information and instructions, a display device 622, such as a cathode ray tube, liquid crystal display, etc, coupled to said bus 601 for displaying information to the computer user, an alphanumeric input device 625 including alphanumeric and other keys coupled to said bus 601 for communicating information and command selections to said processor 602, and a cursor control device 627, such as a mouse, track-ball, cursor control keys, etc, coupled to said bus 601 for communicating information and command selections to said processor 602 and for controlling cursor movement. Finally, it is useful if the system includes a hardcopy device 629, such as a printer, for providing permanent copies of information. The hardcopy device 629 is coupled with the processor 602, main memory 604, static memory 606 and mass storage device 607 through bus 601.

In the preferred embodiment, the bus 601 is a "high speed" bus. This refers to the speed at which data is transmitted on the bus. Although the bus will embody physical properties that will enable high speed transmission, the actual control of the speed is through a system clock. It is the system clock which synchronizes and times the transmission of data to and from the bus. Bus architectures in microcomputer systems are well known in the art, thus no further discussion is necessary. In the preferred embodiment, the system clock will operate at a speed of at least 33 MegaHertz (MHz).

A first way to increase the processing performance of a computer system is to increase the clock cycle speed upon which the system operates. A second way of increasing processing performance is to perform a given task in as few clock cycles as possible. A major task that is inherent within computer systems is the transmission and receipt of data over a bus between the different processing components described with reference to FIG. 6. The present invention provides for using a high speed bus i.e. a bus operating at a high clock cycle speed and allowing for the transfer of data (i.e., the transmission and receipt) on every clock cycle. Moreover, the present invention only utilizes one clock input source. This avoids the expense and difficulty of precisely synchronizing (i.e. phase shifting) alternate clock sources.

Clocking and Routing

In the preferred embodiment, the clocking and routing scheme disclosed is utilized at the system level, i.e. between computer system components embodied on Printed Circuit Boards (PCBs), i.e. between chip components mounted on the PCB which transmit and receive data. Alternatively, the invention may be used between components on different PCBs. In any event, the term unit will be used to denote either a PCB or a chip component. The term local bus is used to denote a data communication means between two or more units.

A unit in the preferred embodiment may both transmit and receive data and provides for two clock inputs. A circuit design for handling two clock inputs in a unit is described below with respect to Internal Unit Synchronization (see FIG. 10 and accompanying discussion). However, units which only receive data or which only transmit data may be coupled to the units of the preferred embodiment. Each unit uses a traditional clock (CLK) for all functions (i.e., internal clock references, data sampling, etc.) except that of driving data onto the local bus. The units use a separate data clock (DCLK) as the reference for the transmission of output data. This separate data clock if obtained from the same signal as the traditional clock. Each Unit has CLK and DCLK input pins so that known routing techniques can be applied to ensure that in a clock source path all CLK inputs lead all DCLK inputs. This has the effect of all CLK input source signals leading all DCLK input source signals. This routing technique takes advantage of inherent time skewing that will occur to the input pins of each unit due to propagation delay in the conductive paths of the PCB or other conducting means.

The units in the preferred embodiment are further capable of tolerating a zero hold time. A zero hold time refers to a unit designed so that the data on the bus need not be held in a valid or reliable state, after a rising edge of a clock cycle has transpired.

Figure 7:
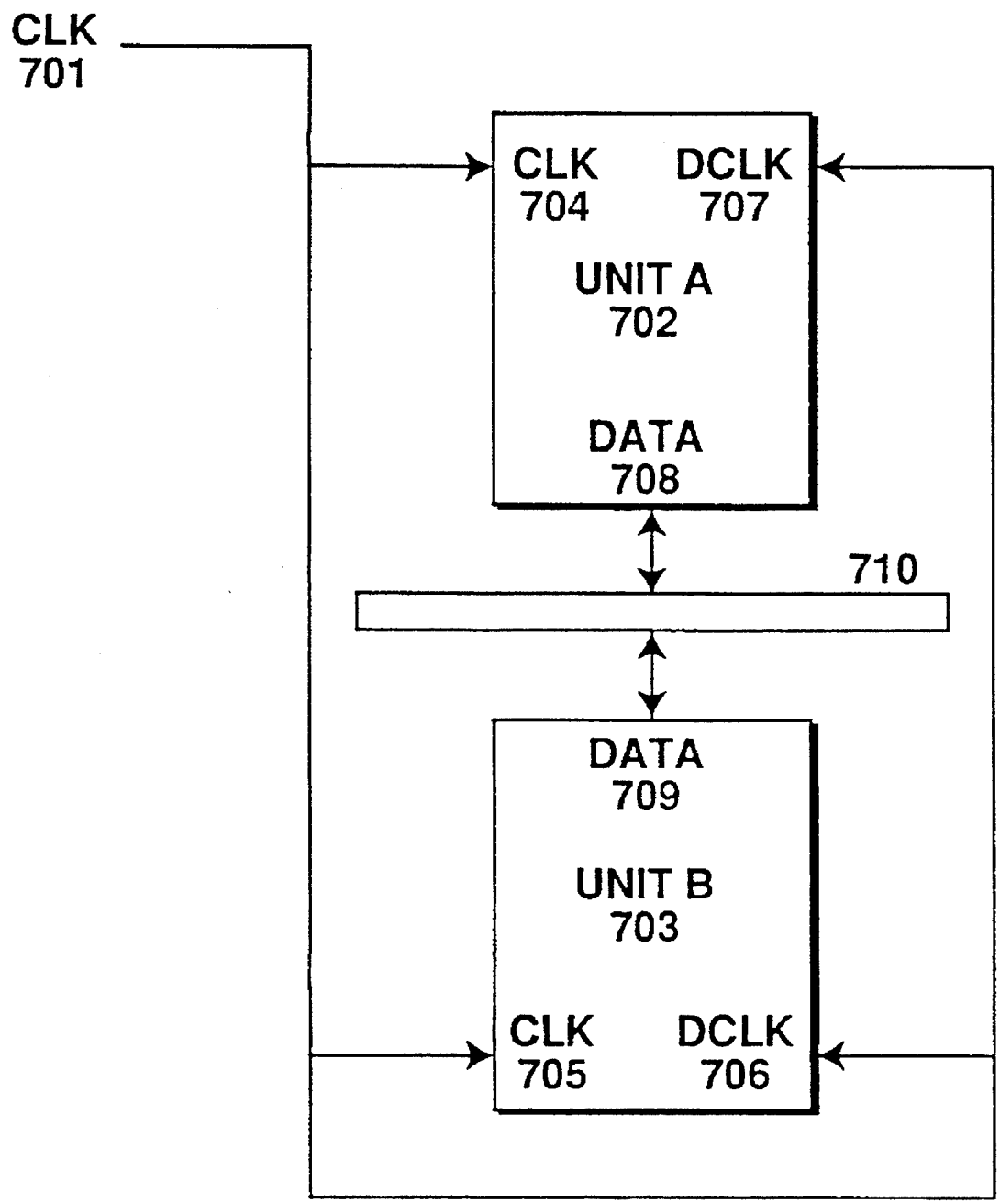
FIG. 7 is a block diagram of a clocking and routing scheme as may be utilized by the present invention.
Figure 8:
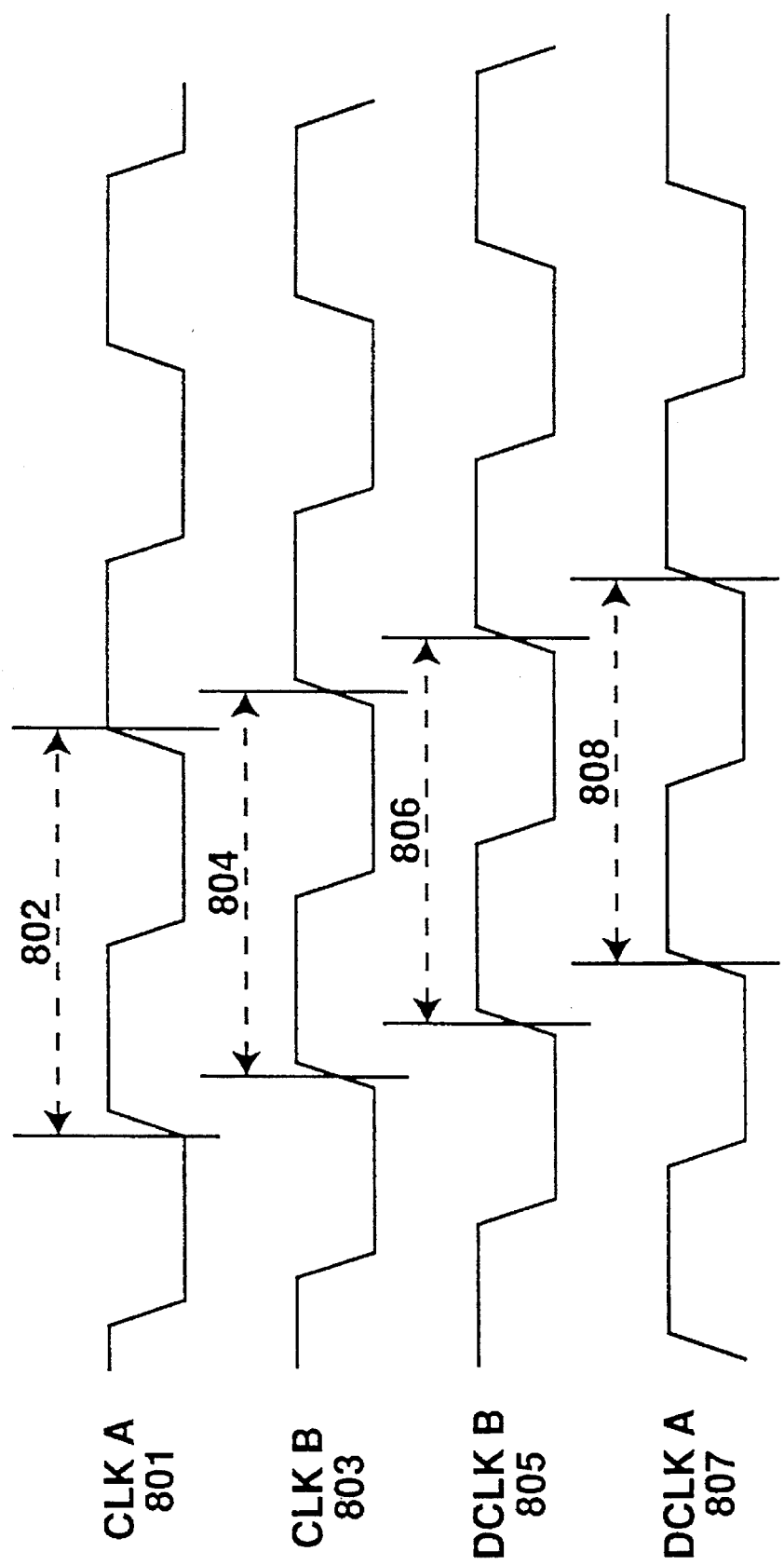
FIG. 8 is a timing diagram illustrating a skew of the clock cycle inputs to the units in the preferred embodiment of the present invention.

FIG. 7 illustrates the routing scheme of the preferred embodiment. In FIG. 7, a CLK source 701 is first routed to the clock input pin 704 of UNIT A 702. The clock source 701 is then routed to clock input pin 705 and then to DCLK input pin 706, both of UNIT B 703. Finally, the CLK source is routed to DCLK input pin 707 of UNIT A 702. Each of UNIT A 702 and UNIT B 703 are coupled to a data bus 710 via data lines 708 and 709, respectively. The timing to each of the clock input pins is illustrated in FIG. 8. In FIG. 8, the CLK signal at CLK 704 is signal 801, the CLK signal at CLK 705 is signal 803, the DCLK signal at DCLK 706 is signal 805 and the DCLK signal at DCLK 707 is signal 807. Due to skewing, a clock cycle on a first clock input pin will be started and completed prior to a clock cycle on later clock input pins. Thus, the cycle 804 that would be on input pin CLK 705 would correspond to cycle 802 for input pin CLK 704. Likewise, the cycles 806 and 807 would be later in time.

FIG. 9a illustrates the timing and data sequencing when Unit A is transmitting data to Unit B. The data clocked onto the data bus by the DCLK signal 807 for Unit A is reflected by the data signal 901. The areas 903 reflect start-up time, where the data being placed onto the bus is unreliable. The areas 904 reflect time where the data on the data bus is reliable. The lines 902 reflect sampling (reading) points where the Unit B will be sampling data on the data bus. Thus, since CLK B signal 803 is leading the DCLK A signal 807, the data being sampled on the bus is valid.

FIG. 9b illustrates the timing and data sequencing when Unit B is transmitting to Unit A. The data clocked onto the data bus by the DCLK signal 805 is reflected by the data signal 910. The areas 913 reflect start-up time, where the data being placed onto the data is unreliable. The areas 914 reflect time where the data on the data bus is reliable. The lines 911 reflect sampling points where the Unit A will be sampling data on the data bus. Thus, since CLK A signal 801 is leading the DCLK B signal 805, the data being sampled on the bus is valid.

In the preferred embodiment, any number of units may be utilized; if any unit is to both transmit and receive data, the unit will both a CLK input pin and a DCLK input pin. The general routing technique of first connecting all CLK inputs and then all DCLK inputs will assure that the skewing of the clock cycles will occur in the proper direction. It should also be noted that for a particular unit, its CLK input must only lead the DCLK inputs from units that it would receive data from. Thus, it is not required that all CLK inputs lead all DCLK inputs. For example, it is not necessary for a particular unit that its CLK input leads its DCLK input. This relaxes the requirement of how the PCB is laid out. However, if a unit is only to receive data, then its CLK input should lead all DCLK inputs; similarly if a unit is only to transmit data, its CLK input pin should be treated as a DCLK input pin. The actual route of the CLK source signal taken will depend on a number of factors, including placement of the units, the placement of units with which a particular unit will transmit/receive data to/from and the placement of the pins in the packaging of the unit.

Internal Unit Synchronization

A resultant effect of the present invention is that synchronization problems may occur within a particular unit. Since all of the units internal operations will be referenced from the CLK source, while the data transmission operation will be referenced to the DCLK source, the data to be clocked out may be unreliable due to the phase difference between the operation of the internal circuits and the DCLK source. This problem is further complicated by the fact that the clock skew from CLK to DCLK within a circuit can be in either direction (i.e. leading or lagging), since it is not required that a unit's CLK signal lead its DCLK signal.

Figure 10:
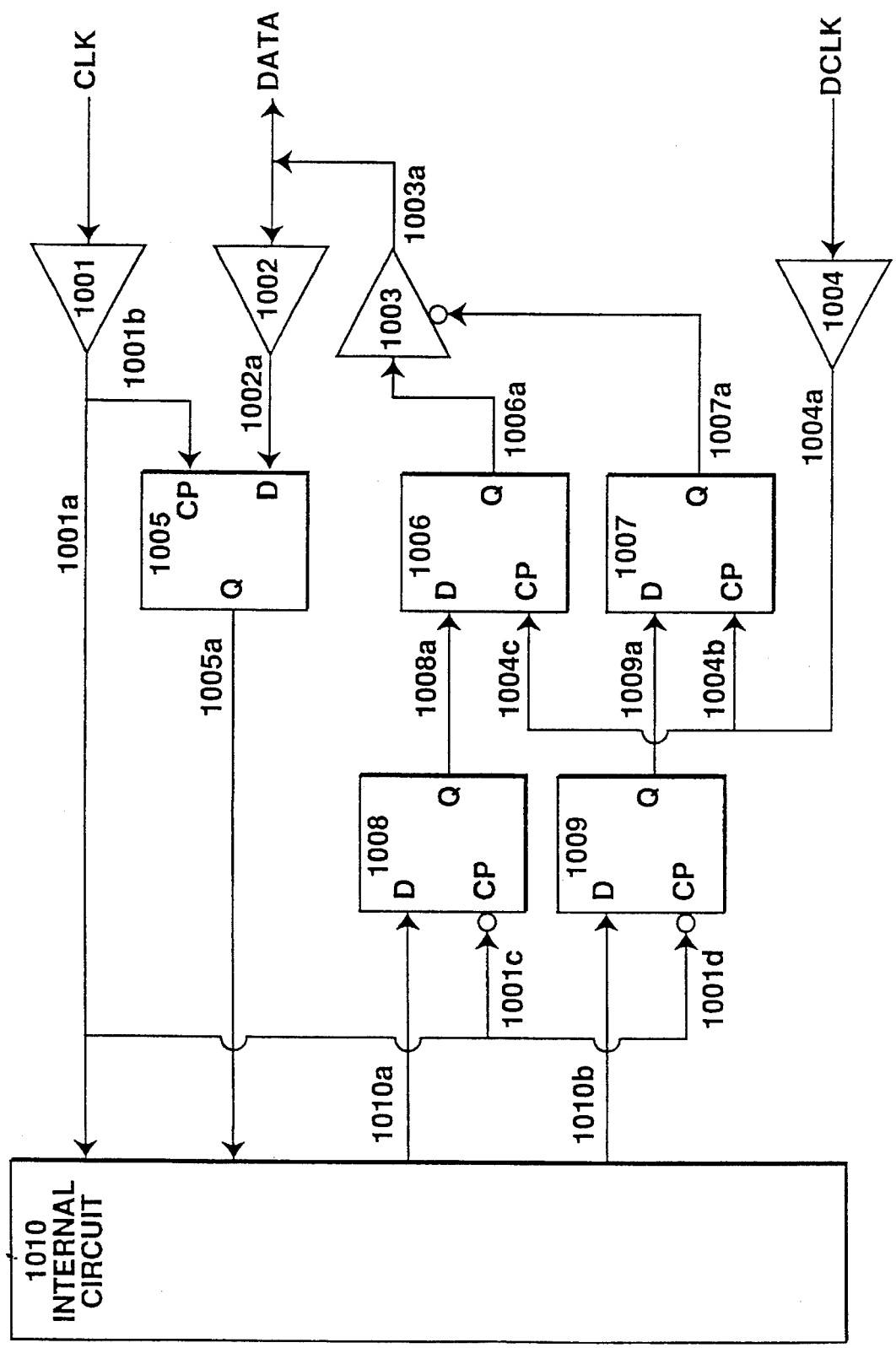
FIG. 10 is a block diagram of an internal unit synchronization circuit as may be utilized by the present invention.

FIG. 10 illustrates a circuit which may be utilized by a unit which will eliminate the aforementioned internal synchronization problem. A clock driver, 1001 receives a CLK signal and drives it in a conventional manner through the unit. Data is clocked into the unit through input driver 1002 which places the data into an input register 1005. In the preferred embodiment all registers are edge triggered D flip-flops. Edge triggered D flip-flops have two input lines, D and CP. The CP input line is coupled to a clocking source and will cause data from line D to be transferred to an output line Q upon detection of either a rising edge or falling edge (the choice is up to the circuit designer as long as all flip-flops with a unit are consistently of one type) of the clocking source. Edge triggered D flip-flops are well-known in the art. Thus, no further description is deemed necessary. A CLK line 1001b is coupled to the register 1005, through which data is cycled into the unit's internal circuitry 1010. As described earlier, the unit's internal circuitry 1010 operates with reference to the signal on the CLK line and no further clock signals, unlike the prior art, are necessary.

With respect to the output or driving of data, the CLK driver 1001 provides a line 1001c for a first output register 1008 and a line 1001d for a second output register 1009. The registers 1008 and 1009 are triggered at the opposite clock edge as other registers. The data from the internal circuitry 1010 provides data to the register 1008 through a data line 1010a. The transmit or receive state of the unit is indicated by the signal on line 1010b which is coupled to the D input of flip-flop 1009; specifically, if the unit is transmitting, line 1010b will have one logical state and if the unit is receiving, the line 1010b will have another logical state. This logical state will control whether a tri-state output driver 1003 allows outputting of data from register 1006 (if the unit is transmitting) or (if receiving) prevents outputting by setting the output of the driver 1003 in a high impedance state. It will be apparent that the signal on line 1010b is a conventional signal available in most conventional units which can either transmit (e.g., write) or receive (e.g., read). The output of the register 1008 provides the D input to a third output register 1006 through a line 1008a. Likewise, the output of the register 1009 provides the D input to the register 1007 through a line 1009a. The DCLK clock source 1004 provides the DCLK clock source to the register 1006 through line 1004c and to the register 1007 through line 1004b. The output of the register 1006 is coupled to the input of the tri-state output driver 1003, which is coupled to the data bus. The output of register 1007 is coupled to the control line of the driver 1003.

When the CLK cycle leads the DCLK cycle, synchronization is accomplished by the registers 1008 and 1009 which sample at the falling edge of the CLK cycle followed by sampling of the registers 1006 and 1007 at the DCLK rising edge.

Figure 11A:
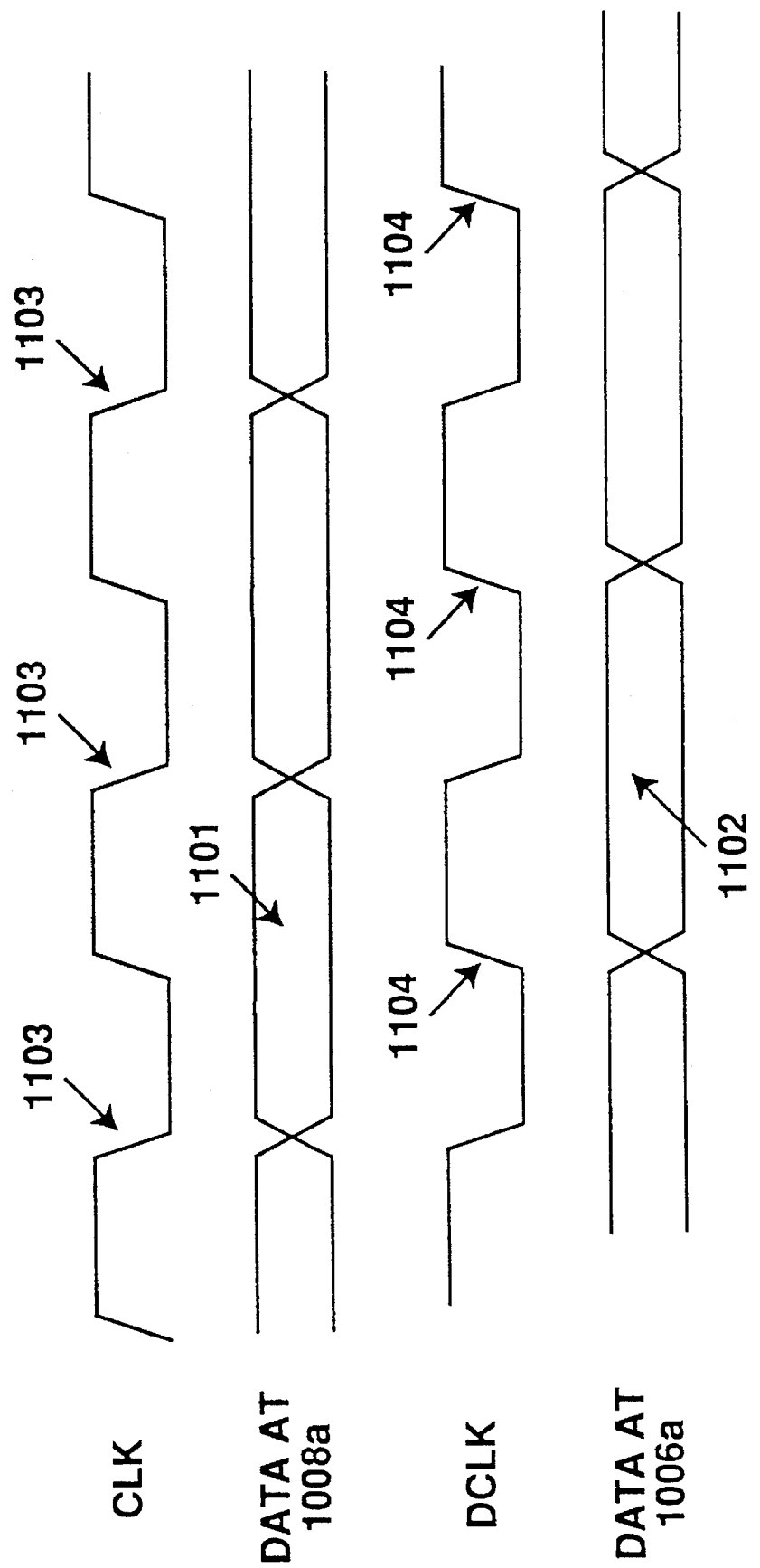
FIGS. 11a and 11b are timing diagrams illustrating the timing of the presentation of data as may be utilized by the present invention.
Figure 11B:
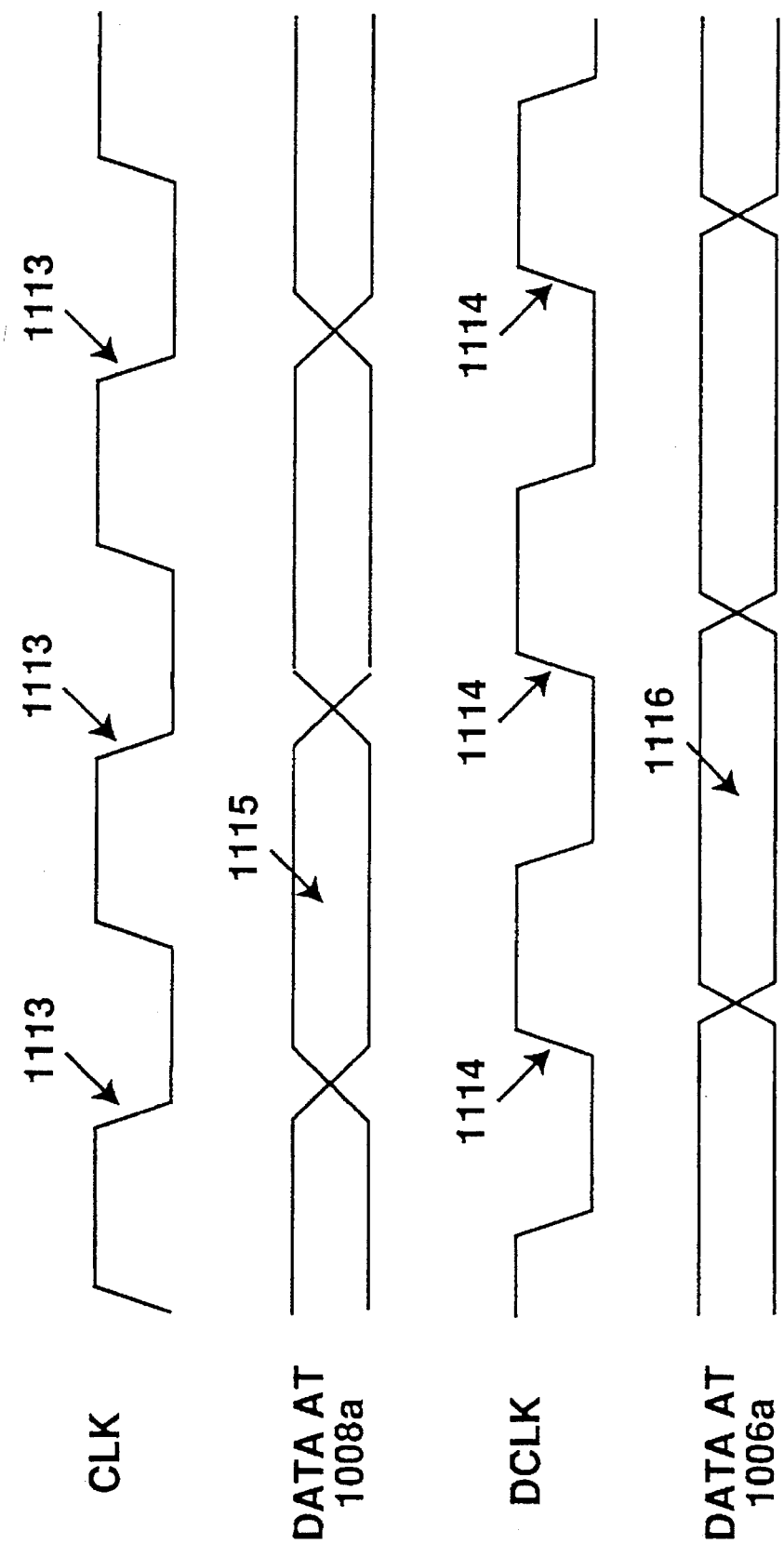

The synchronization is illustrated in FIGS. 11a and 11b. In FIG. 11a, the CLK cycle is leading the DCLK cycle. The CLK source will cause data on line 1010a to be presented on line 1008a, on each of the falling edges 1103 of the clock signal. As the line 1008a provides input to register 1006, upon a rising edge 1104 of DCLK source, the data on line 1008a will be presented on line 1006a. Thus, the output data is referenced to the DCLK clock cycles. It should also be noted that the data at times 1101 and 1102 are identical. The synchronization of the data from register 1009 (transmit and receive data) is identical.

In FIG. 11b, the CLK cycle is trailing the DCLK cycles. The CLK signal will cause data on line 1010a to be presented on line 1008a, on each of the falling edges 1113 of the CLK signal. As the line 1008a provides input to register 1006, upon a rising edge 1114 of DCLK source, the data on line 1008a will be presented on line 1006a. Thus, the output data is referenced the DCLK clock cycles. It should also be noted that the data at times 1115 and 1116 are identical. Again the synchronization of the data from the register 1009 (transmit and receive data) is identical.

It should be noted that the above example only exemplifies a single input line and a single output line. In the preferred embodiment, multiple input and output lines are utilized. It would be apparent, to one skilled in the art upon reference to this disclosure, how to utilize circuits with a plurality of input and output lines.

The above described internal synchronization unit may take alternative forms. A first form may as part of a new circuit design, e.g. as part of an integrated circuit. A second form may be as an addition to existing units. In this second form, the internal synchronization unit may itself be an integrated circuit. Alternatively, it may be comprised of discrete components mounted on a printed circuit board. It would be apparent to one skilled in the art to use any of these alternative forms in order to practice the present invention.

Thus, an improved clocking and routing scheme that utilizes a single clock source and which allows units which may both transmit and receive data on a high speed bus is disclosed. Further disclosed, is a circuit design which resolves synchronization problems that may occur as a result of a two clock input design.

I claim:

1. A method for clocking a plurality of functional units with a clock signal, each of said plurality of functional units having a first clock input for clocking a first set of operations and a second clock input for clocking a second set of operations, said method comprising the steps of:

a. providing said clock signal;

b. routing said clock signal to a first clock input associated with a first unit of said plurality of functional units;

c. routing said clock signal to first clock input associated with a second unit of said plurality of functional units; and d. routing said clock signal to a second clock input associated with said first unit of said plurality of functional units;

e. routing said clock signal to a second clock input associated with said second unit of said plurality of functional units, wherein said clock signal at said second clock input associated with said second unit lags the clock signal at said first clock input associated with said first unit and wherein said clock signal is routed such that said clock signal at said second clock input associated with said first unit lags the clock signal at said first clock input associated with said first unit and the clock signal at said second clock input associated with said first unit lags the clock signal at said second clock input associated with said second unit; and wherein said first set of operations includes a receive data operation and said second set of operations includes a transmit data operation enabling a data transfer to occur during a single clock cycle by initiating said receive data operation prior to said transmit data operation.

2. A method for timing the transmission and receipt of data between a plurality of functional units coupled to a data communication bus in a data processing system, said method comprising the steps of:

a. sending a clock signal to a first clock input of a first functional unit of said plurality of functional units that will be receiving data, said first clock input for clocking a first set of operations;

b. routing the clock signal to a second clock input of a second functional unit of said plurality of functional units that will be transmitting data wherein said clock signal at said first clock input leads said clock signal at said second clock input, said second clock input for clocking a second set of operations;

c. transmitting data from said second functional unit responsive to an edge of said clock signal; and d. receiving data by said first functional unit, by sampling said data on said bus using said clock signal which appears at said first clock input wherein said first set of operations includes a receive data operation and said second set of operations includes a transmit data operation enabling a data transfer to occur during a single clock cycle by initiating said receive data operations prior to said transmit data operations.

3. In a computer system comprising a plurality of functional units, each of said plurality of functional units having a first clock input for receiving a first clocking signal for timing the receipt of data and internal operation of said unit and a second clock input for receiving a second clocking signal for timing the transmission of data, a circuit for synchronizing the operation of a unit of said plurality of functional units, said circuit comprising:

a first register coupled to an internal output line of said unit and to said first clock input, said first register for holding output data;

a second register coupled to an output line of said first register and to said second clock input, said second register providing data to a tri-state output driver;

said tri-state output driver coupled to a data bus and having a first logical one (1) state, a second logical zero (0) state and a third high impedance state;

a third register coupled to a transmit/receive line of said unit, said third register for holding transmit/receive data;

a fourth register coupled to an output of said third register and said second clock input, said fourth register providing transmit/receive data to said tri-state output driver;

wherein said first clocking signal leads said second clocking signal enabling a data transfer to occur during a single clock cycle by initiating said receipt of data prior to said transmission of data.

4. The circuit as recited in claim 3 wherein said first register and said second register are D flip-flops.

5. The circuit as recited in claim 3 wherein said first register is triggered on a falling edge and said second register is triggered on a rising edge.

6. The circuit as recited in claim 3 wherein said first register is triggered on a falling edge and said second register is triggered on a rising edge.

7. In a computer system having a processor, random access memory, input/output devices and a bus for conveying information between units within said computer system, said computer system further comprising:

a clock signal source providing a clocking signal;

a first unit having a first input for receiving a clock signal and a second input for receiving said clock signal;

a second unit having a third input for receiving said clock signal and a fourth input for receiving said clock signal; and clock signal coupling means, said clock signal coupling means for providing said clocking signal to said first input and said second input of said first unit and said third input and said fourth input of said second unit, wherein said clock signal coupling means provides said clocking signal to said first input of said first unit and said third input of said second unit before providing said clocking signal to said second input of said first unit and said fourth input of said second unit;

wherein said first input of said first unit and said third input of said second unit are read operation clocking inputs and said second input of said first unit and said fourth input of said second unit are write operation clocking inputs; and wherein a data transfer occurs during a single clock cycle by initiating said read operations prior to said write operations.

8. A method as in claim 1 wherein said clock signal is routed such that said clock signal at said second clock input associated with said first unit lags said clock signal at said first clock input of said second unit.

9. A method as in claim 1 wherein said clock signal is routed such that said clock signal at said first clock input associated with said second unit lags the clock signal at said second clock input associated with said first unit.

* * * * *